United States Patent [19]
Roberts et al.

[11] Patent Number: 5,949,560
[45] Date of Patent: Sep. 7, 1999

[54] OPTICAL TRANSMISSION SYSTEM

[75] Inventors: Kim Byron Roberts, Welwyn Garden; Alan Robinson, Harlow; Richard Edward Epworth, Sawbridgeworth; Henry John Harvey, Bishops Stortford, all of United Kingdom

[73] Assignee: Northern Telecom Limited, Montreal, Canada

[21] Appl. No.: 08/795,684

[22] Filed: Feb. 5, 1997

[51] Int. Cl.⁶ .............................. H04B 10/08; H04B 10/00
[52] U.S. Cl. ........................ 359/110; 359/122; 359/156; 359/161; 359/177
[58] Field of Search ................................. 359/122, 156, 359/161, 177, 173, 110

[56] References Cited

U.S. PATENT DOCUMENTS

| | | | |
|---|---|---|---|
| 4,960,319 | 10/1990 | Dankowych | 350/96.29 |
| 5,473,457 | 12/1995 | Ono | 359/161 |
| 5,513,029 | 4/1996 | Roberts | 359/177 |

OTHER PUBLICATIONS

Poole et al., "Polarization–Mode Dispersion Measurements Based On Transmission Spectra Through a Polarizer". Journal of Lightwave Technology, vol. 12, No. 6, pp. 917–929, Jun. 1994.

IEEE Photonics Technology Letters, vol. 9, No. 1, Jan. 1997 Polarization Mode Dispersion Compensation by Phase Diversity Detection by B.W. Hakki.

B.L. Heffner, IEEE Photonics Technology Letters, Sep. 1992 pp.1066–1069.

Max Born and Emil Wolf, "Principles of Optics", Pergamon Press 1975, pp.23–32;544–545; and 554–555.

S.C.Rashleigh and R. Ulrich, Optics Letters; vol. 3, No. 2; Aug. 1978; "Polarization made dispersion in single mode fibers."

Y. Namihira et al, "Fully Automated PMD measurements"; OFMC 1993, Torino, 1993.

H.G. Jerrard; "Transmission of Light through Birefringent and Optically Active Media: The Poincaré Sphere"; Journal of the Optical Society of America, vol. 44, No. 8, Aug. 1954.

*Primary Examiner*—Kinfe-Michael Negash
*Attorney, Agent, or Firm*—John D. Crane

[57] ABSTRACT

An Optical Transmission System includes a monitor for outputting monitored data representative of the extent to which an optical signal is degraded by polarization mode dispersion. The monitor measures the degree of depolarization present in a sample of the optical signal derived from an optical tap, the depolarization being associated with polarization variation at the bit rate frequency of a signal data stream carried by the optical signal. The monitored data is used to control operation of the system to reroute the optical path taken by the optical signal in the event of a threshold level of polarization mode dispersion being exceeded. A transmitter of the optical signal may also be controlled to minimize polarization mode dispersion by varying the polarization state of the optical signal at launch so as to reduce the measured monitor data. The monitor functions during normal transmission of optical signals without the need for shutting down links of the system for measurement purposes. The invention has particular application to long haul optical transmissions of data streams at 10 Gb/sec or more.

53 Claims, 8 Drawing Sheets

OPTICAL TRANSMISSION SYSTEM

BACKGROUND TO THE INVENTION

This invention relates to optical transmission systems in which optical wave guides interconnect optical terminals for conducting optical signals therebetween, at least one element of the optical transmission system exhibiting birefringence and being susceptible to degradation of the optical signal by polarization mode dispersion.

The presence of polarization mode dispersion can be a limiting factor in the design of optical transmission systems, particularly those providing long haul transmission of signal data streams of 10 Gb/sec or more over single mode fibers of the order of 100 kilometers in length. Although such fibers are nominally "single mode", propagation is generally characterized by two orthogonally polarized $HE_{11}$ modes for which slightly different group velocities exist in the presence of birefringence. Consequently, signal pulses launched into one end of the fiber become degraded by the effect of pulse energy being periodically coupled between the fast and slow propagation modes, the resulting dispersion in the received signal typically being characterized by a polarization mode dispersion parameter M which for long fibers is proportional to $\sqrt{L}$ where L is the fiber length.

The amount of polarization mode dispersion varies from fiber to fiber, being dependent upon the amount of intrinsic birefringence associated with core asymmetry or frozen-in stress and extrinsic birefringence associated for example with cable induced stress, fiber bends or twists.

Optical transmission systems which currently use 10 Gb/s signal data are able to tolerate polarization mode dispersion of the order of 0.2 pico seconds per $\sqrt{\text{(kilometer)}}$. The next generation of optical transmission systems expected to utilize 40 Gb/s data transmission will however be more likely to be limited by the effects of polarization mode dispersion, particularly in systems which incorporate cross connected networks of fibers so that the route taken by an optical signal can be any one of a number of possible routes utilizing different fibers within the same or different cable, each with individual properties.

Existing methods of measuring polarization mode dispersion typically require a series of measurements based on the input of test signals at discreet wavelengths as described by B. L. Heffner, IEEE Photonics Technology Letters, September 1992 pp 1066–1069. Such measurement techniques require complex test equipment and cannot be implemented at the operating frequency while the optical transmission system is in normal use.

It is also known from S. C. Rashleigh and R. Ulrich, Optics Letters; Vol 3, No 2; August 1978, to measure the amount of polarization mode dispersion in short fibers from the depolarization of a test signal constituted by broadbandwidth light.

A fully automated interferrometric PMD (polarization mode dispersion) measurement is also disclosed by Y. Namihira et al, OFMC 93, Torino, 1993, the technique being applied to fiber amplifiers, optical fibers and other fiber optic devices.

It is also known from U.S. Pat. No. 5,473,457 to compensate for PMD in an optical fibre by passing the received optical signal through a polarization maintaining fibre arranged to apply an equal and opposite dispersion, any misalignment between the respective principal axes of the fibres being compensated by means of a polarization controller. The fibre is however assumed to have a predetermined PMD which remains constant.

SUMMARY OF THE INVENTION

It is an object of the present invention to provide an apparatus and method for monitoring polarization mode dispersion in an optical transmission system to detect degradation of the optical signal due to the dispersion process.

It is a further object of the present invention to provide a method and apparatus of controlling the operation of a control device of the system in response to monitored data characterizing the polarization mode dispersion such that the level of degradation as indicated by the monitored data remains within a predetermined limit.

According to the present invention there is disclosed a method of transmitting optical signals in an optical transmission system; the method comprising the steps of:

generating an optical signal modulated by a signal data stream by operation of a transmitter of the optical transmission system; conducting the optical signal via a plurality of optical elements constituted by at least one optical waveguide means and at least one optical terminal of the optical transmission system, at least one of the optical elements being susceptible to polarization mode dispersion;

receiving the optical signal at a receiver constituting an optical terminal of the optical transmission system and outputting the signal data stream therefrom;

monitoring the optical signal by operation of a monitoring means so as to detect degradation of the optical signal consistent with the optical signal having been subject to the effects of polarization mode dispersion during transmission; and outputting from the monitoring means monitored data representative of the extent to which the optical signal is degraded by polarization mode dispersion.

An advantage of such a method is that, by utilizing the modulated optical signal as the basis for PMD measurement, monitoring of PMD can continue during use of the optical transmission system without shutting down specific links in order to conduct experimental measurement using test signals. Furthermore, PMD can be monitored in use of the system over extended periods consistent with the slow varying nature of PMD.

Conveniently, the monitored data may be compared with a threshold value and an alarm indication generated in response to the monitored data exceeding the threshold value.

An operator may thereby be alerted to the need to take remedial action in the event of excessive PMD being detected.

The method preferably includes the step of controlling the operation of the optical transmission system by operation of a control means responsive to the monitored data so as to reduce the effects of polarization mode dispersion on the transmitted optical signal.

The control means may act on the transmitter itself to control the state of polarization launched into the optical waveguide means or may otherwise regulate the signal data stream, for example by regulating the gain of the transmitter or the bit rate of the data stream.

Alternatively the control means may control at least one optical switching device of the optical transmission system so as to reroute the path taken by the optical signal. This for example allows defective optical waveguides to be bypassed when the monitoring means indicates excessive PMD in that particular waveguide.

The control means also may control a compensating optical element constituting an optical element of the system so as to provide compensating dispersion in opposition to the PMD indicated as being present by the monitored data.

The monitoring means preferably derives a sample of the optical signal by operation of an optical tap and measures the degree of depolarization present in the sample of the optical signal.

The degree of depolarization is associated with the modulation imposed on the optical signal by the signal data stream at the bit rate frequency. By monitoring the polarization state using measurements at a band-width significantly lower than the bit rate frequency, the rapid fluctuation in phase associated with the signal modulation appears as a depolarization which is then quantified by the monitoring means to obtain a measurement of PMD.

The method of determining the amount of depolarization preferably includes the step of compensating for other known sources of depolarization than polarization mode dispersion.

According to a further aspect of the present invention there is disclosed an optical transmission system comprising a plurality of optical elements constituted by a plurality of optical terminals and at least one optical waveguide means interconnecting the optical terminals and operable to conduct optical signals modulated by a signal data stream therebetween;

at least one of the optical elements comprising a birefringent element susceptible to degrading the optical signals by polarization mode dispersion; and wherein at least one of the optical elements is coupled to monitoring means operable to monitor degradation of the optical signals consistent with the effects of polarization mode dispersion and to output monitored data representative of such degradation.

According to a further aspect of the present invention there is disclosed monitoring apparatus for use in an optical transmission system, the monitoring apparatus comprising;

sampling means operable to sample a state of polarization of a received optical signal modulated by a signal data stream to provide sampled data; and a processor operable to determine monitored data from the sampled data representative of the effect of polarization mode dispersion in the transmission system.

BRIEF DESCRIPTION OF THE DRAWINGS

Embodiments of the present invention will now be described by way of example only and with reference to the accompanying drawings of which.

DETAILED DESCRIPTION

Figure 1:
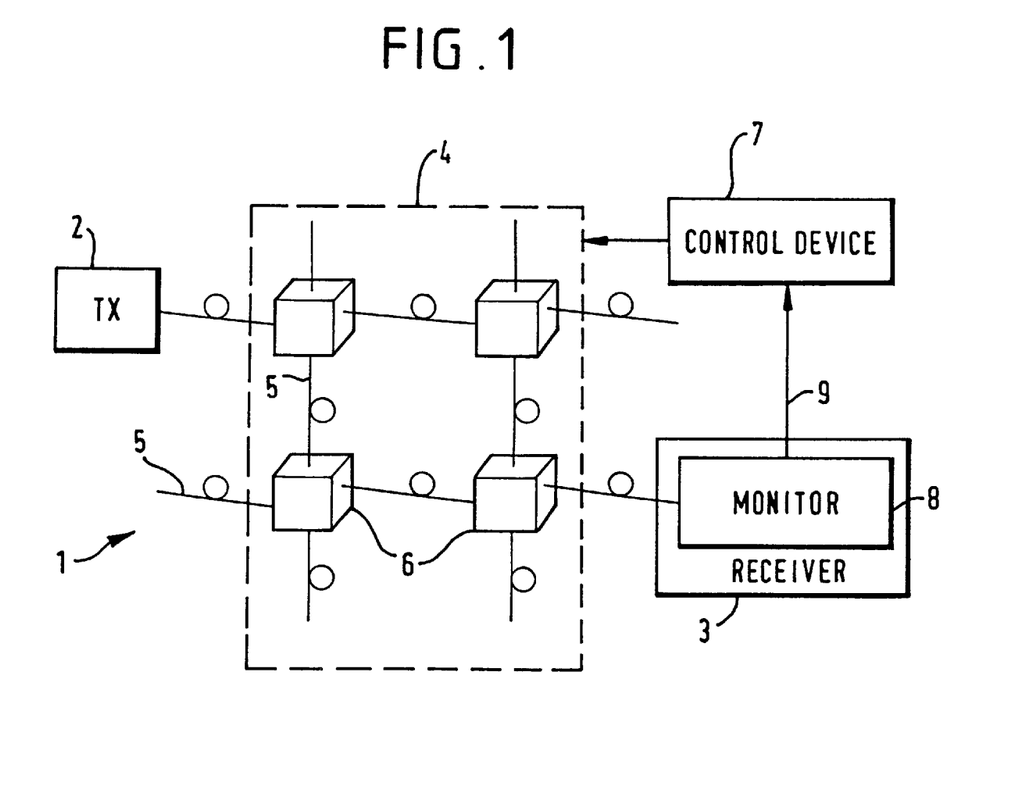
FIG. 1 is a schematic diagram of an optical transmission system in accordance with the present invention.

FIG. 1 shows an optical transmission system 1 in which an optical signal from a transmitter 2 is conducted to a receiver 3 via a network 4 of optical fibers 5, the network including optical cross-connects 6 acting as optical switching devices under the control of a control device 7.

The receiver 3 incorporates a monitor 8 which is operable to monitor degradation of the optical signal consistent with the presence of PMD (polarization mode dispersion) in the fibers 5. The optical signals are generated in the transmitter 2 from a laser source which launches fully polarized monochromatic light into single mode optical fiber and modulates the light with a signal data stream at a bit rate of 40G bits/second. The control device 7 is operable to select the path taken by the optical signals in reaching the receiver 3, or other receivers in the system (not shown), and the amount of PMD to which the optical signal is susceptible will depend upon the particular path selected at any given time as well as other environmental conditions affecting the fibers 5 such as temperature.

The control device 7 is operable to react to monitored data 9 from the monitor 8 so as to reroute the optical signal by appropriate actuation of the cross-connects 6 in the event of the amount of PMD exceeding a predetermined threshold.

It is envisaged that the monitor 8 may be incorporated by addition to an existing receiver 3 or another terminal of the optical transmission system 1 by retrofitting action or may alternatively be incorporated in the system at conception, in either case it being apparent that no specific adaptation of the transmitter as to the manner of encoding the optical signal is required. The monitor 8 is therefore designed to operate on conventionally transmitted optical signals modulated with a signal data stream.

Figure 2:
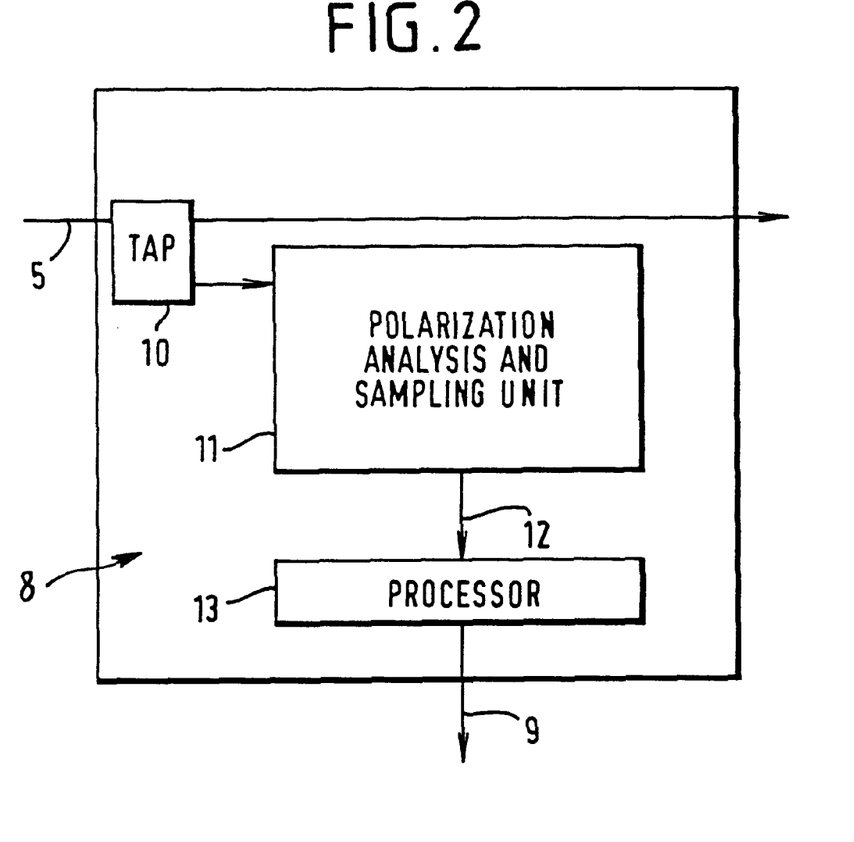
FIG. 2 is a schematic diagram of the monitor of FIG. 1.

FIG. 2 shows schematically the manner in which the monitor 8 is coupled to the fiber 5 within the receiver 3 by means of an optical tap 10 which extracts a small sample of the optical signal for analysis by a polarization analysis and sampling unit 11 providing sampled data 12 to a processor 13. It is envisaged that the processor 13 should be constituted by an existing processor of the receiver 3 or other optical terminal of the system 1, the additional processing requirement being achieved by appropriate additional software.

The polarization analysis and sampling unit 11 and subsequent data processing may take a number of forms of which the following alternative embodiments are described by way of example. According to a first embodiment, the state of polarization of the received optical signal is fully determined and utilized to calculate a measure U of depolarization, ie the extent to which the optical signal has been depolarized by the presence of PMD as a result of frequency deviation F in the launched optical signal from the transmitter 2, such frequency deviation being consequential to amplitude modulation by the signal data stream and any chirp present in the transmission. As described below, the depolarization U can be quantitatively related to the amount M of PMD present in the optical path through the system 1. In the following description, use is made of the Poincaré sphere representation of polarization states, as described for example by H. G. Jerrard in Journal of the Optical Society of America; Vol 44, No 8; August 1954 "Transmission of light through birefringent and optically active media; the Poincaré sphere".

The difference in phase between the fast and slow axis polarizations resulting from frequency deviation F can be expressed as;

$$\delta_2 - \delta_1 = 2\pi MF \qquad \text{equation 1;}$$

where M is the amount of polarization mode dispersion or in other words the time delay between the received polarizations.

Using the conventional Poincaré representation of polarization states, the change of polarization state in the received optical signal corresponding to frequency deviation F may be represented as a movement across the surface of the Poincaré sphere corresponding to an angle V subtended at the center of the sphere, the polarization variation V therefore being defined by;

$$V = 2\pi MF \qquad \text{equation 2;}$$

where V is expressed in radians on the Poincaré sphere.

This expression for V is valid for small values of the product FM, this being a valid approximation for any typical transmission system having an externally modulated transmission.

Figure 3:
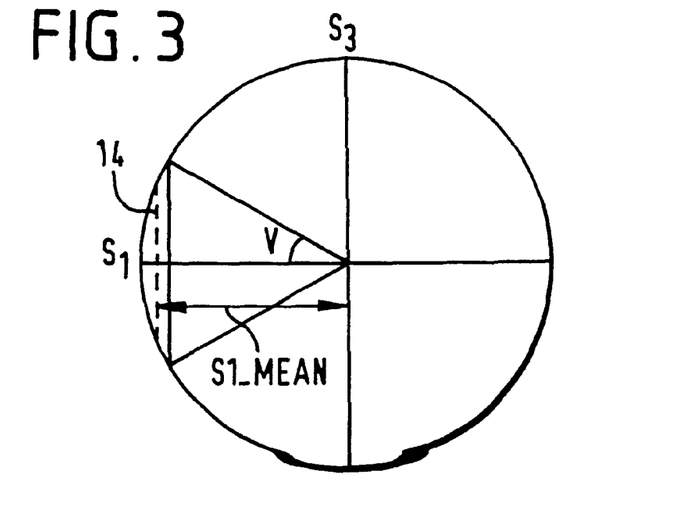
FIG. 3 is a representation of the Poincaré sphere illustrating the extent of polarization variation.

The effect of the frequency deviation F at the bit rate frequency is therefore a rapid variation over a small angle V on the Poincaré sphere, defining as shown in FIG. 3 a cap shaped region 14 of the sphere bounded by a cone of angle 2V. If measurements of polarization state are filtered at low frequency, the effect averaged over time of this polarization variation V is that the received optical signal may be considered to be the sum of an unpolarized component and a polarized component having a polarization state determined as the average position of the distribution of polarization states over the cap 14 of the Poincaré sphere. This approach follows the conventional analysis of quasi-polarized light as described for example in "Principles of Optics" Max Born and Emil Wolff, Pergamon Press, 1975, Chapter 10.8 "Polarization Properties of Quasi Monochromatic Light". As shown in Section 3 of the Annex below, for a Poincaré sphere of unit radius, the time averaged polarization state vector when subject to a polarization variation V is given by the expression ½(1+cos V), thereby effectively reducing the amplitude of the polarization state vector to less than unity by an amount equivalent to the depolarization U.

FIG. 3 shows schematically the definition of a cap 14 on the Poincaré sphere, viewed in projection along the $s_2$ axis and assuming the mean state of polarization to be along the $s_1$ axis.

The polarization analysis and sampling unit 11 is arranged in this embodiment to obtain filtered values of the Stokes parameters $s_0$, $s_1$, $s_2$ and $s_3$ which are defined according to equation 3(a) to 3(d) as follows:

(a) $s_0 = I(0°, 0) + I(90°, 0),$  equation 3;

(b) $s_1 = I(0°, 0) - I(90°, 0),$ (c) $s_2 = I(45°, 0) - I(135°, 0),$ (d) $s_3 = I\left(45°, \frac{\pi}{2}\right) - I\left(135°, \frac{\pi}{2}\right)$ where I(a,b) denotes the intensity of the light vibrations in the direction making an angle a with the X axis, when the Y component of electric field is subject to a retardation b with respect to the X component.

Figure 4:
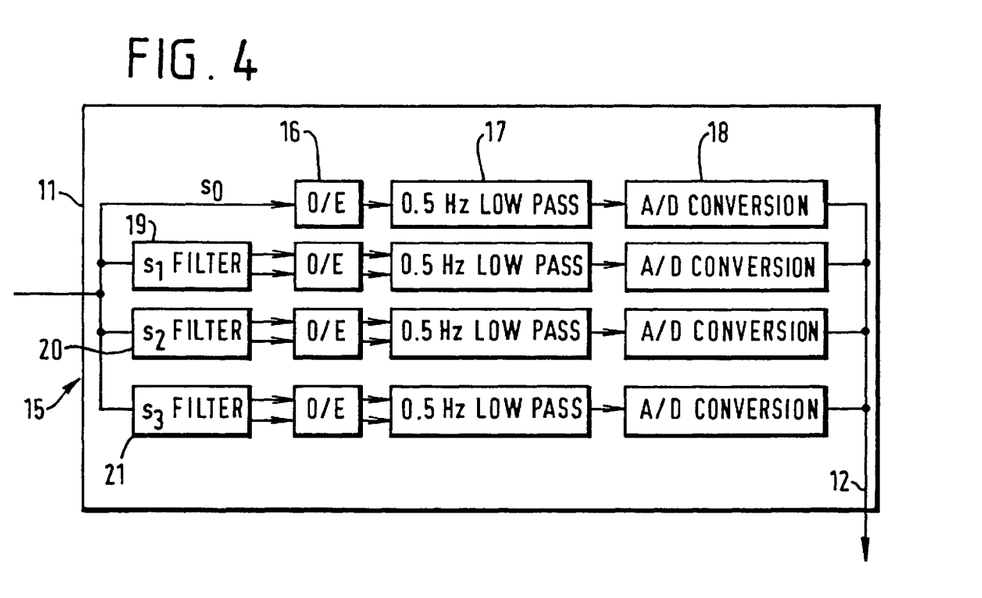
FIG. 4 is a schematic representation of a polarization analysis and sampling unit in accordance with a first embodiment of the present invention.

FIG. 4 shows schematically the structure of the polarization analysis and sampling unit 11. Light from the optical tap 10 is divided in a fourway splitter 15. A signal representing so, the total intensity, is passed via an optical to electronic converter 16, filtered in a low pass filter 17 having a band width 0.5 Hz, and via an analogue to digital converter 18 to provide sampled data 12.

$s_1$ is derived by means of $s_1$, filter 19 producing the outputs I(0,0) and I(90°,0), each of these outputs being processed by converter 16, filter 17 and A/D converter 18 to provide sampled data 12.

Similarly, $s_2$ filter 20 provides outputs I(45°,0) and I(135°, 0) and $s_3$ filter 21 provides outputs I(45°,π/2) and I(135°,π/2).

The processor 13 thereby receives sampled data enabling $s_0$, $s_1$, $s_2$ and $s_3$ to be determined. The value of depolarization U may then be calculated from;

$$U = \frac{S_0 - \sqrt{(S_1^2 + S_2^2 + S_3^2)}}{S_0} \qquad \text{equation 4;}$$

As indicated above, the processor is thereby able to determine an instantaneous value M of the amount of PMD, given the value F for the transmission system, and given equal powers launched in each of the principal states. Since however the instantaneous value M will commonly vary at a rate of minutes to hundreds of minutes as for example the fiber cable flexes and moves, a mean value of M is determined by repeating the above measurements over time and taking the mean value as the output monitored data 9 used to control the control device 7 of FIG. 1.

As described in Section 7 of the Annex, the mean value of U can be related to the mean value of M. This relationship is however relatively difficult to compute and it is preferable to utilize a simpler expression.

$$\overline{U} = \frac{1}{4} - \frac{1}{4} \cos 2\pi \overline{M} \qquad \text{equation 5;}$$

where $\overline{U}$=mean value of U $\overline{M}$= mean value of M

Figure 15:
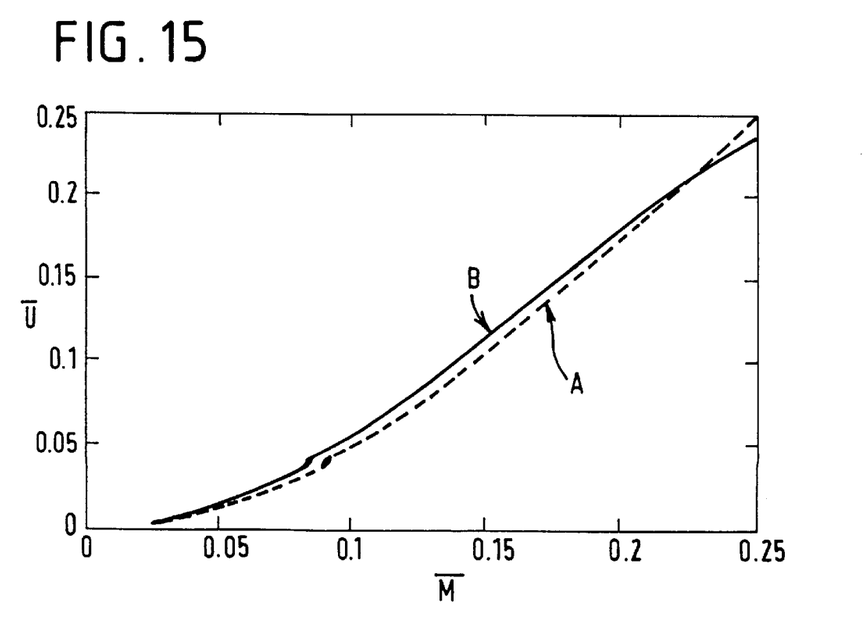
FIG. 15 is a graphical representation of the relationship between Mean U (depolarization) and Mean M (polarization mode dispersion).

Equation 5 is an approximation derived by curve fitting methods for the more exact solution proposed in Section 7 of the Annex, the validity of this approximation being illustrated graphically in FIG. 15 in which curve A represents values of $\overline{U}$ using the above approximation and curve B represents values of $\overline{U}$ using the more exact solution.

Figure 5:
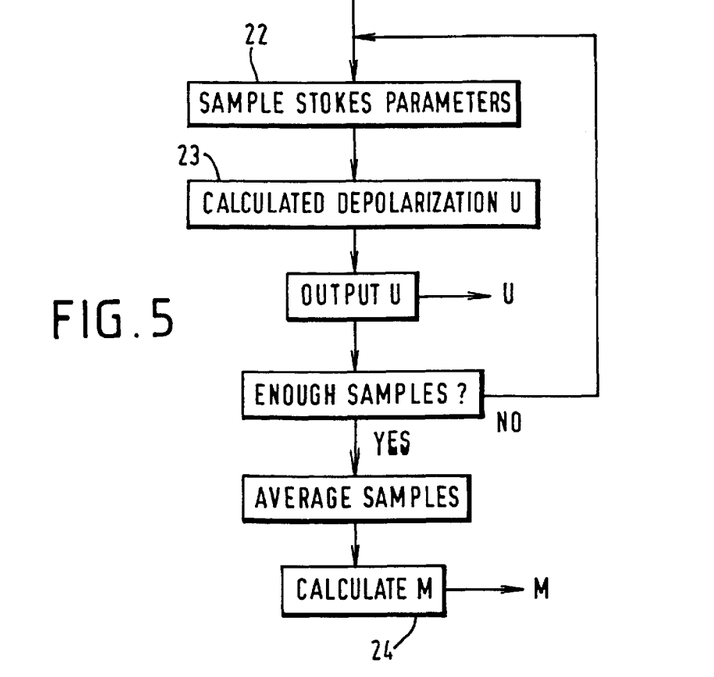
FIG. 5 is a schematic flow chart illustrating the data processing carried out by the processor in accordance with the first embodiment.

The above method is summarized in the flow chart of FIG. 5 in which a sampling step corresponds to the operation of the polarization analysis and sampling unit 11 described with reference to FIG. 4 and the calculation of depolarization U is performed in calculation step 23 by the processor 13. As indicated in the flow chart of FIG. 5, an average value of U is calculated before calculating the output value of M in step 24.

The first embodiment described above requires a relatively complex polarization analysis and sampling unit 11 in order to enable the state of polarization to be fully determined by calculating each of the Stokes parameters. A second embodiment will now be described in which the hardware is simplified to some extent, thereby enabling implementation at reduced cost. The second embodiment will be described using corresponding reference numerals to those of preceding figures where appropriate for corresponding elements.

Figure 6:
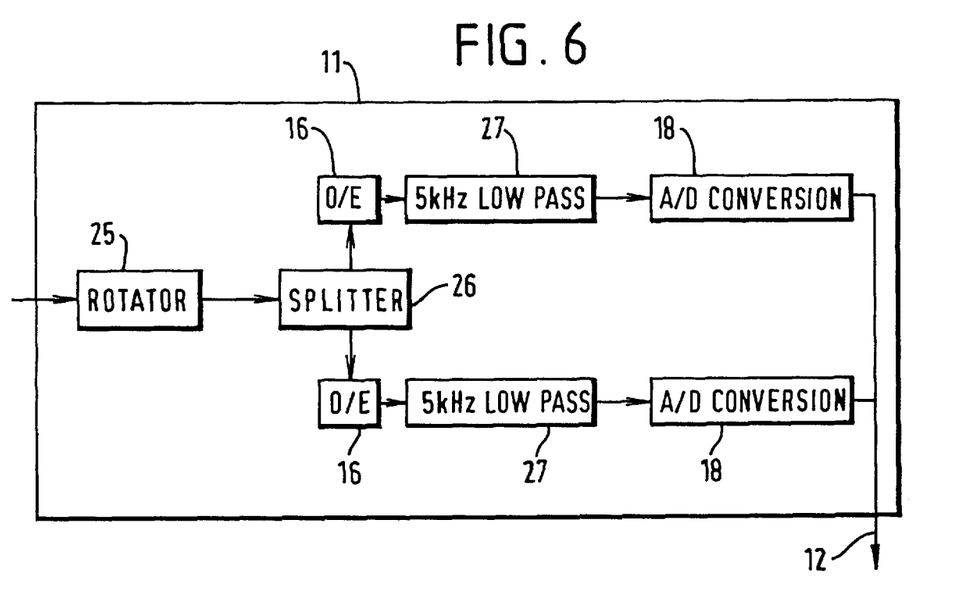
FIG. 6 is a schematic diagram of a polarization analysis and sampling unit of a second embodiment of the present invention.

FIG. 6 shows schematically an alternative form of polarization analysis and sampling unit 11 in which the light signal derived from the optical tap 10 is input to a polarization rotator 25, the effect of which is to introduce a random change in polarization state at a rate of the order of kilohertz. This may be visualized as random movement relative to the Poincaré sphere, thereby enabling the statistical distribution of polarization states to be more conveniently determined by polarization analysis and sampling. The output of the rotator 25 is provided by a polarization splitter 26 operable to split the light into two orthogonal linear polarizations, each of which is converted from optical to electrical signal by converters 16, passed through a 5 kilohertz low pass filter 27 and converted to a digital signal by A/D converters 18.

The resulting sampled data 12 is output to the processor 13 as a series of sampled values C and D from which the normalized Stokes parameter S1 can be calculated from:

$$S1 = \frac{s_1}{s_0} = \frac{C \cdot D}{C + D} \qquad \text{equation 6;}$$

This formulation for S1 follows from the conventional definition of the Stokes parameter $s_1$ and $s_0$. Since the samples are filtered by the filters 27 to a band width which is much less than the bit rate frequency at which frequency modulation F occurs, the measured values of S1 are mean values which, as described above with reference to the Poincaré sphere representation in FIG. 3, are less than $s_0$ by an amount corresponding to the depolarization U. Consequently, values of S1 can be expected to vary randomly over time between limits of $\pm(1-U)$. Statistical analysis of the sampled values of S1 will therefore provide a measure of U.

Figure 7:
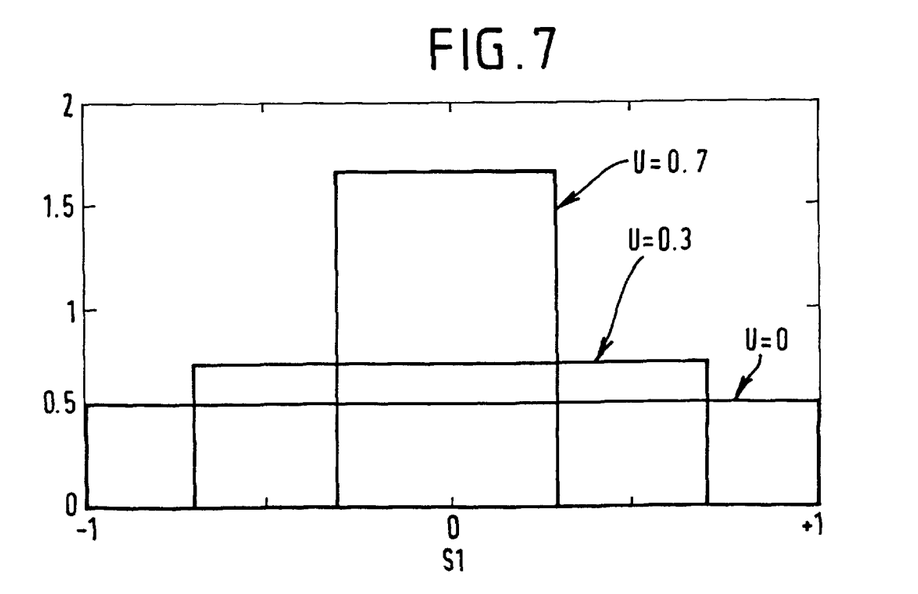
FIG. 7 is a graphical representation of the statistical distribution of the normalized Stokes parameter S1.

Examples of theoretical distributions of S1 are given in FIG. 7 for values of U equal to 0, 0.3 and 0.7.

FIG. 7 illustrates that, for fully polarized light (U=0) the distribution of S1 is uniform. For progressively larger values of U, ie the light becomes progressively depolarized, the distribution shrinks between decreasing maximum and minimum limiting value of S1. Ultimately, for totally unpolarized light, the distribution would be a delta function at the origin of S1.

Figure 8:
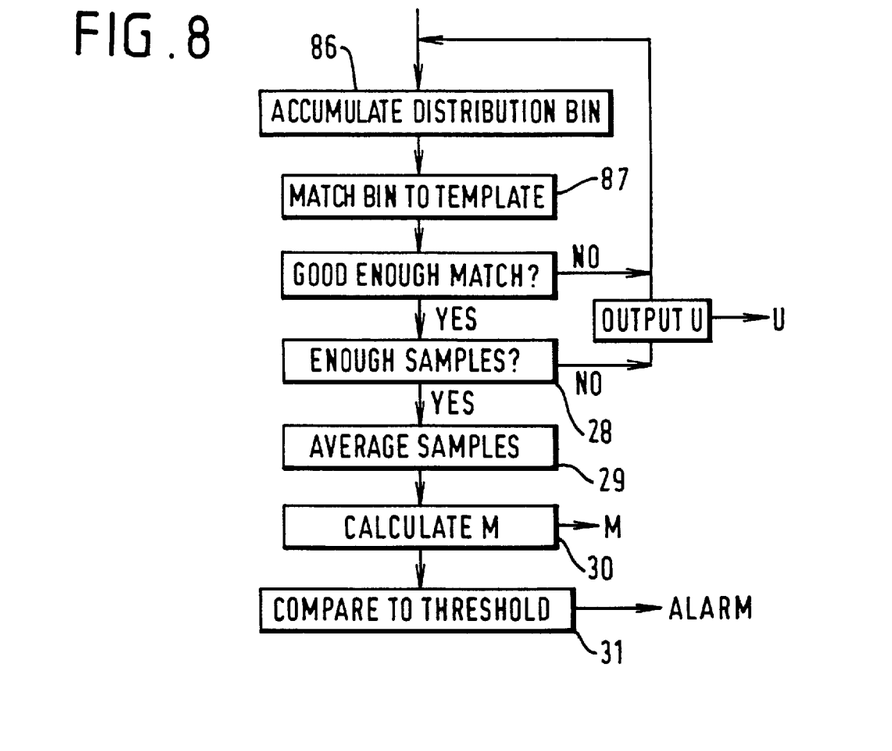
FIG. 8 is a schematic flow chart illustrating the processing of data according to the second embodiment.

According to the method of the present invention in this second embodiment, the degree of depolarization is determined by correlating the measured distribution of S1 against theoretical curves or templates such as those shown in FIG. 7 ie theoretical S1 distributions for a range of values of U. To achieve this statistical analysis, sampled data 12 from the arrangement of FIG. 6 is input to the processor 13 and accumulated according to size in an array of 256 data bins until sufficient data is accumulated to establish a definite form of probability distribution. The processing steps are outlined in the flow chart of FIG. 8 in which the accumulation of data in bins is carried out in accumulation step 86 and correlation with theoretical templates in correlation step 87. When correlation is achieved, a value of U corresponding to the template of best correlation is stored and the process repeated until enough samples of U are judged to have been accumulated at decision step 28. An average value of the samples of U is then determined at averaging step 29 and a value M of PMD calculated from the average value of U at calculation step 30. The output value M constitutes the monitored data 9 which may be output to the control device 7 of FIG. 1 and compared with a predetermined threshold. Comparison with the threshold may alternatively or additionally be utilized in step 31 to initiate an alarm condition either locally or at a remote location.

A third embodiment will now be described using corresponding reference numerals to those preceding figures where appropriate for corresponding elements.

Figure 9:
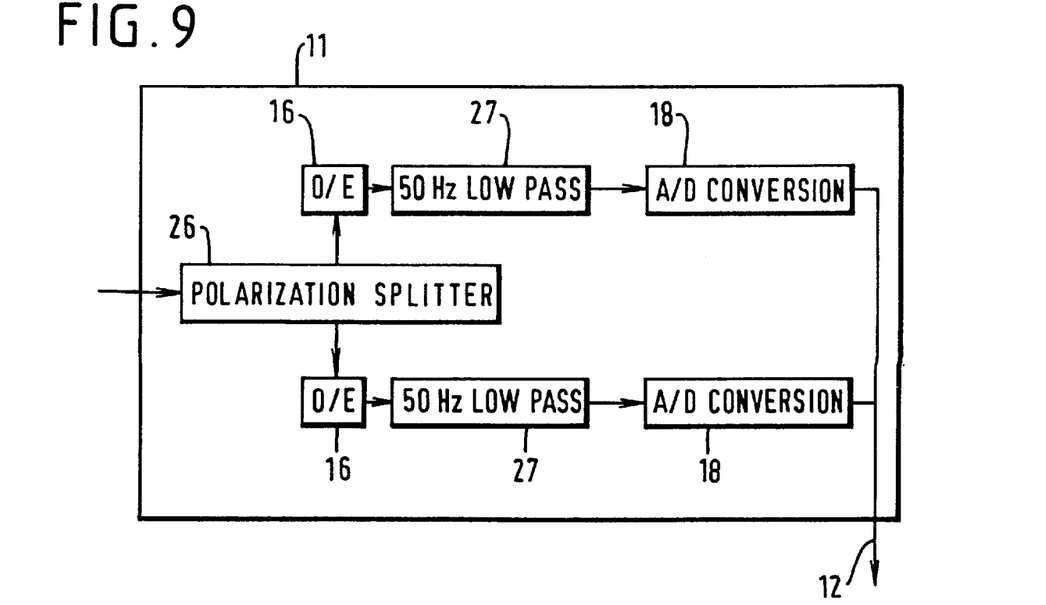
FIG. 9 is a schematic diagram of a polarization analysis and sampling unit of a third embodiment of the present invention.

The third embodiment has a polarization analysis sampling unit 11 as shown in FIG. 9 which is similar to the arrangement of FIG. 6, differing primarily in that no polarization rotator is included. The unit 11 includes a polarization splitter which divides the light output from the optical tap 10 into orthogonal polarizations, the intensities of which are converted from optical to electrical signals by converters 16 and passed through low pass filters with a band width of 50 Hz. The respective outputs are converted to digital signals by A/D converters 18 to form sampled data output 12 to the processor 13.

This arrangement has the advantage of simplicity in that the polarization rotator is omitted but requires a different form of analysis of the resulting distribution of S1 derived from the sampled data 12 and using equation 6.

The statistical distribution of S1 is again determined but in this instance the theoretical distribution templates corresponding to different amounts M of PMD are different. This is because, in the absence of a polarization rotator, the evolution of the polarization state over the Poincaré sphere relies upon gradual change in the polarization rotation Φ introduced by birefringent elements of the system and the polarization alignment θ between the launch state polarization and closest principal axis of the optical transmission system 1, these parameters being independently variable and slowly varying compared with the period over which samples are taken. Variations in the orientation of the principal axes of the system vary the extent to which the signal is subjected to PMD. If the launch state is coincident with a principal axis then zero PMD effect will be observable whereas if the launch state has equal energy distribution between polarizations aligned with the principal axes then 100% of the signal will be subjected to PMD. For any given launch polarization therefore, the fully polarized signal power can be considered as the sum of a component subjected to PMD and a second component which is not susceptible to PMD. The evolution of the polarization state is therefore accompanied by a slow variation in the magnitude of polarization variation V.

Figure 10:
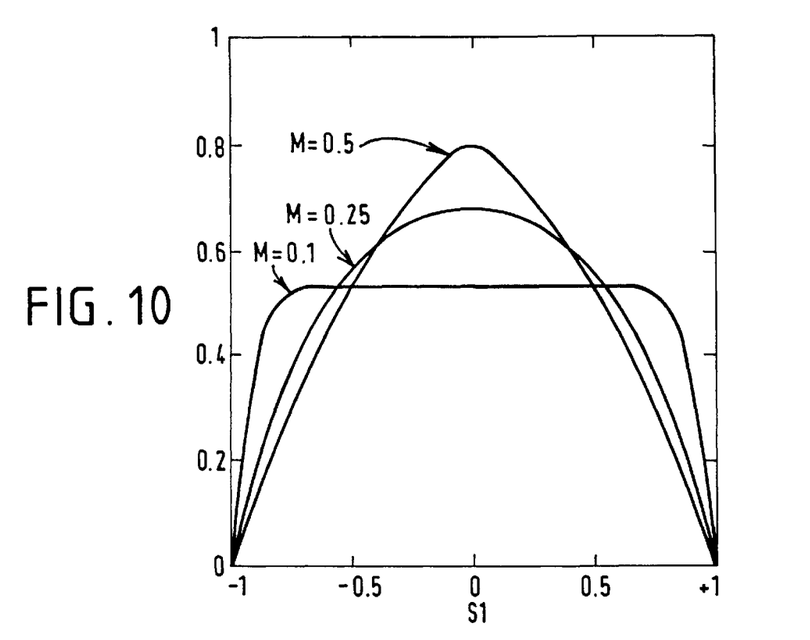
FIG. 10 is a graphical representation of the statistical distribution of the normalized Stokes parameter S1 derived according to the third embodiment of the present invention.

Theoretical distributions of S1 taking into account the above factors are illustrated in FIG. 10 for M=0.1, M=0.25 and M=0.5.

The derivation of these templates is given in the Annex.

Figure 11:
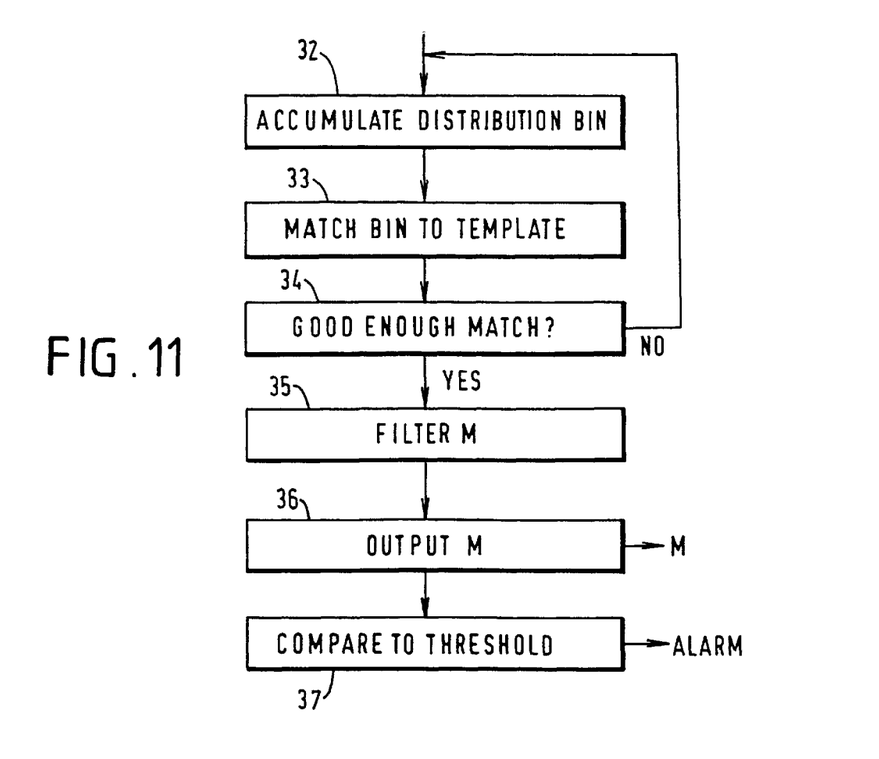
FIG. 11 is a schematic flow chart of the processing carried out in accordance with the third embodiment.

FIG. 11 illustrates schematically a flow chart for deriving a value M of PMD from statistical analysis of S1. Sampled data 12 from the unit of FIG. 9 is accumulated in an array of 256 distribution bins at accumulation step 32 and the accumulated data correlated with templates corresponding to the theoretical template curves of FIG. 10 at correlation step 33. When sufficient correlation is indicated by measurement of the size of the peak of correlation at step 34, the value of M is stored and the process repeated. Successive value of M are obtained and filtered at step 35 and finally step 36 outputs the filtered value of M to constitute the monitored data 9 which may be output to control device 7 of FIG. 1. The filtered value of M may also be compared to a pre-determined threshold at comparison step 37 and, if the threshold is exceeded an alarm signal generated either locally with respect to the monitor or at a remote location.

Figure 12:
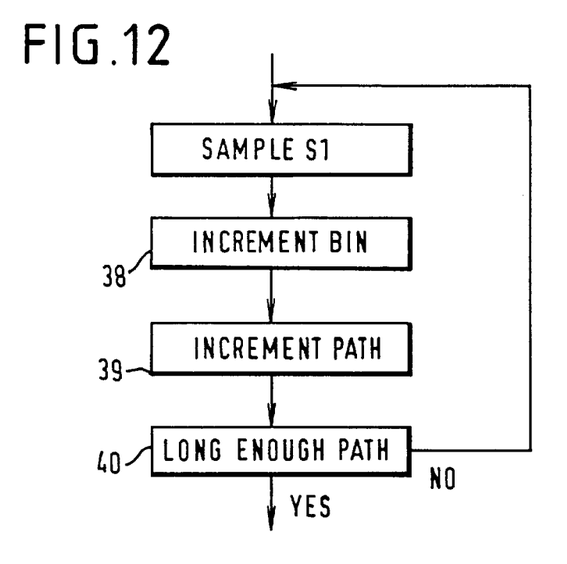
FIG. 12 is a further schematic flow chart of processing carried out in accordance with the third embodiment.

The accumulation step 32 of FIG. 11 also includes a procedure for checking the extent to which phase exploration of the Poincaré sphere has occurred. This is illustrated schematically in the flow chart of FIG. 12 in which successive samples of S1 are used to increment the appropriate bin of an array characterizing the distribution at step 38, the change in linear polarization phase relative to the preceding sample being determined and used to increment a counter 39 which records the accumulated path of exploration of the phase. Each linear polarization phase is estimated for a given sample by calculating the arctan of the square root of the ratio of the power in the two polarizations. The accumulated path measured in counter 39 provides an indication of the area of the Poincaré sphere explored as the random motion over the sphere evolves. Decision step 40 determines whether the accumulated phase recorded in the counter 39 exceeds a predetermined limit (in the present example 3,600°), the processor then proceeding with the correlation step 33 of FIG. 11.

Figure 13:
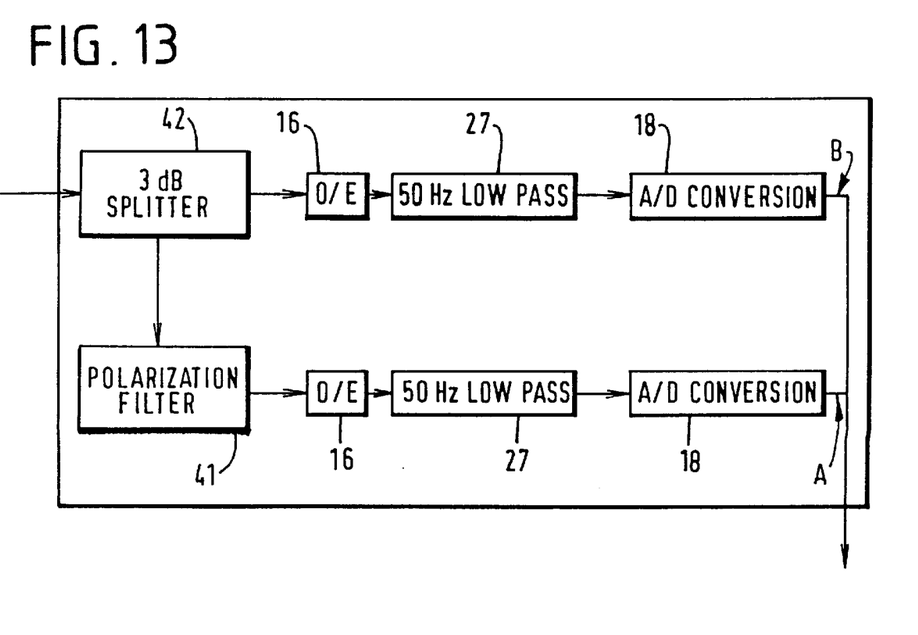
FIG. 13 is a schematic representation of a polarization analysis and sampling unit according to a fourth embodiment of the present invention.

A fourth embodiment will now be described using corresponding reference numerals to those of preceding figures where appropriate for corresponding elements. As shown in FIG. 13, a further simplification of the polarization analysis and sampling unit 11 of FIG. 9 is achieved by using only a single polarization filter 41, the incoming optical signal derived from the optical tap 10 being first equally divided by a splitter 42. The output of the splitter 42 therefore contains all polarization states of the sampled signal whereas the output of the polarization filter 41 is selected to contain only one linear polarization state. The respective outputs are processed by optical to electronic converters 16, 50 Hz low pass filters 27 and analogue to digital converters 18 to provide digital samples A and B corresponding to the single polarization output of filter 41 and the unmodified polarization output of splitter 42 respectively. For such signals, equation 6 becomes $$S1 = \frac{s_1}{s_0} = \frac{2A - B}{B} \qquad \text{equation 7;}$$

The statistical analysis of the normalized Stokes parameter S1 then follows the method described above with reference to the third embodiment and FIGS. 9–13. Calculation of the accumulated phase described with reference to counter 39 is however modified to take account of the nature of signals A and B, each phase increment being calculated to be arcsin (A/B).

Figure 14:
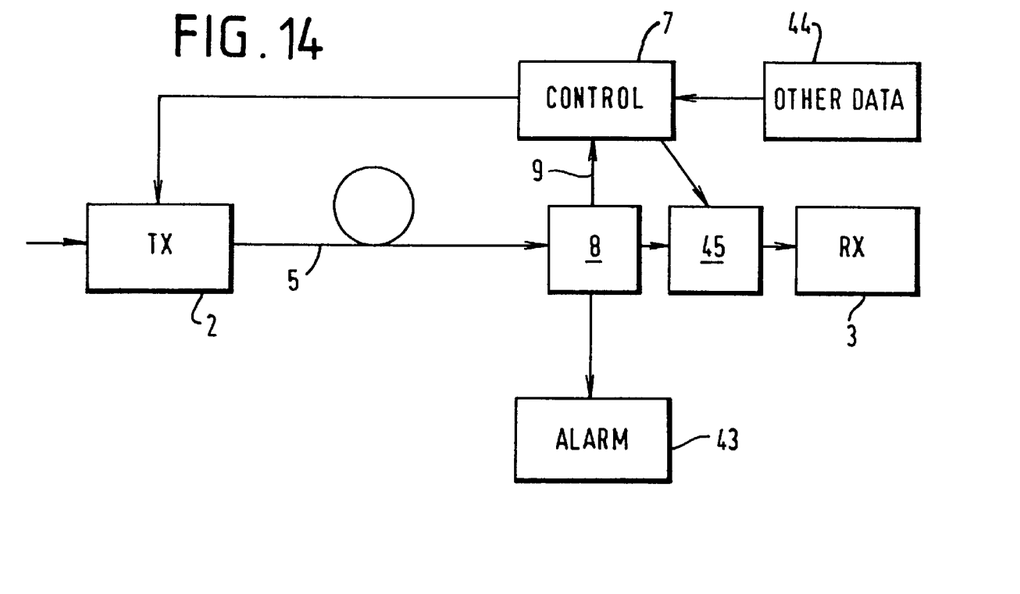
FIG. 14 is a schematic representation of an alternative optical transmission system in accordance with the present invention.

FIG. 14 shows schematically the manner in which a monitor 8 can be incorporated in an optical transmission system at any suitable location and not necessarily within the receiver 3, it being sufficient that the monitor is located so as to be able to derive via an optical tap a sample of the optical signal which has been transmitted through some optical element such as an optical fiber susceptible to polarization mode dispersion to be measured. In the system of FIG. 14, the monitor 8 compares the measure of PMD with a threshold in order to generate an alarm signal by means of an alarm device 43 to which it is connected. The alarm device 43 may be located in the proximity of the monitor 8 or may alternatively be remotely located, for example at a central control station for the system, the function of the alarm signal being to alert an operator to the need to take remedial action.

The monitor 8 outputs monitored data 9 to the control device 7 which in this system is connected to the transmitter 2 in a manner which facilitates control of the transmitter. The transmitter 2 may for example be controlled to vary the launch state of polarization of the optical signal so as to reduce the measurable effects of PMD by tracking a principal axis of the system, ie rotating the launch polarization to coincide with the orientation achieving minimum PMD. A method of controlling the launch state of polarization is described for example in U.S. Pat. No. 4,960,319.

The transmitter 2 may alternatively or additionally be controlled to alter the bit rate of the signal data stream and/or the wavelength at which the optical signal is propagated.

The control device 7 may also receive additional data characterizing other sources of depolarization such as amplified spontaneous emission which may be independently measured by known means such as those disclosed in U.S. Pat. No. 5,513,029. The input of such other data is indicated schematically in FIG. 14 as data input 44. The data input 44 may alternatively be connected directly to the monitor so that the monitored data is automatically compensated. The input of additional data to the control device 7 may also be used to vary the threshold level of PMD to take account of other system parameters such as Q margin or optical power level.

The control device may receive monitored data from a number of monitors located at different parts of a system, thereby enabling control functions such as route determination to be optimized.

The control device 7 may alternatively or additionally be used to control a compensating optical element 45 inserted into the system so as to provide compensating dispersion in opposition to the PMD indicated as being present by the monitored data.

The present invention may also be applied to optical transmission systems in which wavelength division multiplexed optical signals are transmitted. In such systems, the monitoring means may be arranged to derive monitored data from a selected wavelength component of the optical signal utilizing a dither technique similar to the method disclosed in U.S. Pat. No. 5,513,029. By applying mutually orthogonal dither waveforms to each wavelength component, depolarization effects associated with a particular wavelength component can be isolated in the monitor by correlation with an appropriate dither waveform corresponding to the dither waveform applied to the specific wavelength component of interest. Stokes parameters (or the normalized Stokes parameter S1) may thereby be computed for each wavelength component and the respective amounts of PMD determined.

In the above described embodiments, the templates for the S1 distributions are derived from theoretical analysis using appropriate approximations. Alternatively, the templates may be derived empirically by measurements carried out on the system to which the monitor is connected and this may for example be appropriate in systems where the assumptions required to derive theoretical templates do not hold good.

In the second embodiment described above with reference to FIG. 6, the polarization rotator 25 is located in the monitor 8, after the optical tap. The rotator may alternatively be located elsewhere in the system, ie before the optical tap, if the resulting rotation of the polarization state of the optical signal may be tolerated or otherwise advantageous.

The monitored data in the above described embodiments is representative of the value M of PMD. It may alternatively be appropriate for the monitored data to be representative of the amount U of depolarization.

Annex
Section 1

The distribution of polarizations out of a long fiber is uniform over the Poincare sphere. S1 is the difference between the power in the two linear states. This section calculates the distribution of S1 for signals of varying amounts of polarization, and shows that it is uniformly distributed over a symmetric range set by the degree of polarization.

S1 ranges from +1 to −1 for a unit sphere.

The area of a circular region on a sphere of angle V from center to edge:

$$\text{area}(V) := \int_0^V 2 \cdot \pi \cdot \sin(\alpha) d\alpha$$

$$\text{area}(V) := -2 \cdot \cos(V) \cdot \pi + 2 \cdot \pi$$

The $\cos(V)$ is $S$ $$\text{area} := -2 \cdot S1 \cdot \pi + 2 \cdot \pi$$

$$\text{area} := 2 \cdot \pi \cdot (1 - S1)$$

The density of the distribution of S1 equals the negative of the derivative of area with respect to S1, divided by the total area of a sphere.

$$\text{Density\_}S1(S1) := \frac{1}{2}$$

Unpolarized light has S1=0.

Let U be the proportion of the light power that is unpolarized, then the distribution of S1 of that signal is:

$$\text{Density\_}U(S1, U) := \text{if}\left[|S1| \le (1 - U), \frac{1}{[2 \cdot (1 - U)]}, 0\right]$$

This is shown in FIG. 7.
Section 2

This section determines the distribution of the effect of the principle axis of the PMD, for a constant value of PMD. It is shown that the portion of the signal susceptible to PMD is uniformly distributed from zero to one.

Given an assumption of a linear birefringent system, variations in the principle axis of the PMD do not change the amount of PMD, but rather change the amount of the signal subject to PMD. By symmetry, let the S1 axis be the principle axis of the PMD and let the launch polarization change about the sphere, the converse of the actual case.

For any given launch polarization, the fully polarized signal power can be considered as the sum of two components: signal=With_PMD+NO_PMD With_PMD is the component with equal power in each of the principle axis, i.e. S1(With_PMD)=0

No_PMD is the component that remains, that lies only on the principle axis, i.e. S1(signal)=S1(NO_PMD)

As calculated in section 1, the distribution of the S1(signal) is uniformly equal to ½, for a launch polarization uniformly distributed on the Poincare sphere, so the distribution of S1(NO_PMD) must also be uniformly equal to ½. This makes the distribution of the power level of NO_PMD uniformly equal to 1, as the positive and negative S1 densities are added together due to finding the closest linear polarization.

The optical power of the signal With_PMD, being (1−NO_PMD) must then also have uniform distribution density of 1, and a range of 0 to 1.

Section 3

This section calculates the amount of depolarization due to uniform averaging over a circular cap on the Poincare sphere. If the cabled fiber were truly a simple linear birefringent element, then an arc would be the appropriate area. As the birefringence is usually more complicated, a circular area approximation is used for the complicated path.

Let us use the S1 axis for simplicity, as the degree of polarization does not depend upon how the measurement is done.

The mean S1 averaged uniformly over a circular region of the unit Poincare sphere, centered at the S1 axis, with angle from the axis to the edge of the circle being V:

$$S1\_\text{mean} := \frac{\int_0^V 2 \cdot \pi \cdot \sin(\alpha) \cdot \cos(\alpha) d\alpha}{\text{area}}$$

$$S1\_\text{mean} := \frac{\int_0^V 2 \cdot \pi \cdot \sin(\alpha) \cdot \cos(\alpha) d\alpha}{-2 \cdot \cos(V) \cdot \pi + 2 \cdot \pi}$$

$$S1\_\text{mean} := \frac{1}{2} \cdot \cos(V) + \frac{1}{2}$$

For the effect of PMD and the source wavelength variation being approximated b circular cap on the Poincare Sphere of angle V, this gives the mean S1.

$$V := 2 \cdot \pi \cdot F \cdot M \quad \text{Where } F \text{ is the single sided frequency}$$
$$\text{variation of the source in Hz,}$$
$$\text{and } M \text{ is the PMD in seconds.}$$

$$S1\_\text{mean} := \frac{1}{2} \cdot \cos(V) + \frac{1}{2}$$

$$S1\_\text{mean} := \frac{1}{2} \cdot \cos(2 \cdot \pi \cdot F \cdot M) + \frac{1}{2}$$

This is the averaged value of S1, for the case when the average output polarization state is aligned with the S1 axis.
Section 4

This section calculates the distribution of the depolarization due to PMD considering the distribution of the principle axis.

Now, the PMD effect is not on the whole signal, but only on the portion With_PMD as defined in section 2, so this scales the unit sphere. The unpolarized portion due to averaging over the circular region is unity minus S1_mean, as the unpolarized portion has an S1 of 0.

$$U := (1 - S1\_\text{mean}) \cdot \text{With\_PMD}$$

$$U := \left[\frac{1}{2} \cdot (1 - \cos(2 \cdot \pi \cdot F \cdot M))\right] \cdot \text{With\_PMD}$$

As With_PMD is uniformly distributed from 0 to 1, and F and M are being held constant, this means that U has a uniform distribution, whose upper range boundary is set by F and M, and whose lower range boundary is 0.

Section 5

This section puts the above pieces together and determines the distribution of S1 that would be measured for a constant F and M.

By considering the two dimensional density of U and S1, where the boundaries of the S1 uniform distribution are a linear function of U, the density of S1 alone can be calculated.

The two dimensional region of non-zero density for some F*M is a triangle in U vs. S1:

$$T(S1) := \text{if } [|S1|<1, (1-|S1|), 0]$$

F*M puts an upper bound on U, truncating the triangle $$\left[\frac{1}{2} \cdot (1 - \cos(2 \cdot \pi \cdot F \cdot M))\right]$$

The resulting quadrilateral needs to be scaled to an area of unity:

$$\text{Scale}(F, M) := \left[\frac{1}{2} \cdot (1 - \cos(2 \cdot \pi \cdot F \cdot M))\right] \cdot \left[2 - \left[\frac{1}{2} \cdot (1 - \cos(2 \cdot \pi \cdot F \cdot M))\right]\right]$$

$$\text{Density} := \frac{\text{if}\left[|S1| < \left[\frac{1}{2} \cdot (1 + \cos(2 \cdot \pi \cdot F \cdot M))\right], \left[\frac{1}{2} \cdot (1 - \cos(2 \cdot \pi \cdot F \cdot M))\right], T(S1)\right]}{\text{Scale}(F, M)}$$

Section 6

If the polarization states are being explored significantly more rapidly than the value of M is changing, then section 5 has calculated the final distribution, as enough data can be accumulated while M is reasonably constant. However if this is not true, then the Maxwellian distribution of M must be considered.

$$\text{Maxwell}(M, \sigma) := \sqrt{\frac{2}{\pi}} \cdot \frac{M^2}{\sigma^3} \cdot e^{\frac{-M^2}{2\sigma^2}}$$

Where $M$ is the PMD, and sigma the variance $$\text{Mean}(\sigma) := \int_0^\infty \text{Maxwell}(M, \sigma) \cdot M \, dM$$

$$\text{Mean}(\sigma) := \int_0^\infty \sqrt{\frac{2}{\pi}} \cdot \frac{M^2}{\sigma^3} \cdot e^{\frac{-M^2}{2\sigma^2}} \cdot M \, dM$$

$$\text{Mean}(\sigma) := 2 \cdot \frac{\sqrt{2}}{\sqrt{\pi}} \cdot \sigma$$

Therefore:

$$\sigma := \frac{1}{4} \cdot \text{Mean\_M} \cdot \sqrt{2} \cdot \sqrt{\pi}$$

$$\text{Maxwell}(M, \sigma) := \sqrt{\frac{2}{\pi}} \cdot \frac{M^2}{\sigma^3} \cdot e^{\frac{-M^2}{2\sigma^2}}$$

The density of S1 for a given Mean is the integral along M of the density of that S1 and M.

$$\text{Density\_M}(\text{Mean}, F, S1) := $$

$$\int_0^\infty \text{Maxwell}(M, \text{Mean}) \cdot \text{Density}(S1, F, M) \, dM$$

This is shown in FIG. 10

Section 7

Equations for Methods 1 and 2

U is the degree of depolarization

With_PMD is the portion of the light that has equal power in both principal axis, as defined in section 2.

As calculated in section 3:

$$S1\_\text{mean} := \frac{1}{2} \cdot \cos(2 \cdot \pi \cdot F \cdot M) + \frac{1}{2}$$

As measured from the Stokes Parameters:

$$U := \frac{s_0 - \sqrt{(s_1)^2 + (s_2)^2 + (s_3)^2}}{s_0}$$

$$U := (1 - S1\_\text{mean}) \cdot \text{With\_PMD}$$

(When aligned with S1 axis)

-continued $$U := \left(\frac{1}{2} - \frac{1}{2} \cdot \cos(2 \cdot \pi \cdot F \cdot M)\right) \cdot \text{With\_PMD}$$

As described in section 4 above, With_PMD is uniformly distributed from 0 to 1. M varies with a Maxwellian distribution.

This can be considered in two parts:

$$U := p1 \cdot \text{With\_PMD}$$

where $$p1 := \left(\frac{1}{2} - \frac{1}{2} \cdot \cos(2 \cdot \pi \cdot F \cdot M)\right)$$

$$M\_p1(p1, F) := \frac{a\cos\left[\left(p1 - \frac{1}{2}\right) \cdot -2\right]}{2 \cdot \pi \cdot F}$$

For F* M less than unity

From section 6 above, the density of M is:

$$\text{Maxwell}(M, \text{Mean}) := \frac{32}{\pi^2} \cdot \frac{M^2}{\text{Mean}^3} \cdot \exp\left[-4 \cdot \frac{M^2}{(\text{Mean}^2 \cdot \pi)}\right]$$

Thus the density of p1 is:

$$\text{density\_p1}(p, \text{Mean}, F) :=$$

$$\sum_{n=0}^{\infty} \frac{\text{Maxwell}\left[\frac{a\cos\left[\left(p - \frac{1}{2}\right) \cdot -2\right] + 2 \cdot \pi \cdot n}{2 \cdot \pi \cdot F}, \text{Mean}\right]}{\left[d_{d-p} \frac{a\cos\left[\left(p - \frac{1}{2}\right) \cdot -2\right]}{2 \cdot \pi \cdot F}\right]}$$

The mean of U equals:

$$\text{Mean\_U}(M, F) := 0.5 \cdot \int_0^1 p \cdot \text{density\_}p1(p, M.F) \, dp$$

This relates the mean of the degree of depolarization, U, to the mean of the PMD, M.

The graph of FIG. 15 shows that there is a difference between the mean U and U calculated simply from the mean of the PMD.

When the accuracy is required, then this calculation can be done. However, the simple calculation from the mean to the mean is a reasonable approximation for many cases.

Empirical methods can be used to establish the connection between U and M for cases where these assumptions and approximations are not sufficient.

What I claim is:

1. A method of transmitting optical signals in an optical transmission system; the method comprising the steps of:
   generating an optical signal by operation of a transmitter of the optical transmission system;
   modulating the optical signal to obtain a modulated optical signal encoded with an information carrying signal data stream; conducting the modulated optical signal via a plurality of optical signal via a plurality of optical elements constituted by at least one optical waveguide means and at least one optical terminal of the optical transmission system, at least one of the optical elements being susceptible to polarization mode dispersion;
   receiving the modulated optical signal at a receiver constituting an optical terminal of the optical transmission system and outputting the signal data stream therefrom;
   monitoring the modulated optical signal by operation of a monitoring means so as to detect degradation of the modulated optical signal having been subject during transmission to the effects of polarization mode dispersion in the presence of modulation by the signal data stream; and
   outputting from the monitoring means monitored data representative of the extent to which the modulated optical signal is degraded by polarization mode dispersion.

2. A method as claimed in claim 1 including the step of comparing the monitored data with a threshold value and generating an alarm indication in response to the monitored data exceeding the threshold value.

3. A method as claimed in claim 1 including the step of controlling the operation of the optical transmission system by operation of a control means responsive to the monitored data so as to reduce the effects of polarization mode dispersion on the modulated optical signal.

4. A method as claimed in claim 3 wherein the control means controls the operation of the transmitter.

5. A method as claimed in claim 4 wherein the control means controls the operation of the transmitter so as to variably control the state of polarization of the modulated optical signal launched into the optical waveguide means.

6. A method as claimed in claim 4 wherein the control means controls the operation of the transmitter to regulate the signal data stream.

7. A method as claimed in claim 3 wherein the control means controls at least one optical switching device of the optical transmission system so as to reroute the path taken by the modulated optical signal.

8. A method as claimed in claim 3 wherein the control means controls a compensating optical element constituting an optical element of the system so as to provide compensating dispersion in opposition to the polarization mode dispersion indicated as being present by the monitored data.

9. A method as claimed in claim 1 wherein the monitoring means derives a sample f the modulated optical signal by operation of an optical tap and measures the degree of depolarization present in the sample of the modulated optical signal.

10. A method as claimed in claim 9 including the step of compensating for known sources of depolarization other than polarization mode dispersion.

11. A method as claimed in claim 9 wherein the monitoring means performs an analysis of the state of polarization of the sample of the optical signal, filtered to a band width which is less than that of the modulation of the modulated optical signal by the signal data stream.

12. A method as claimed in claim 11 wherein the monitoring means fully determines the filtered polarization state in terms of the Stokes parameters and computes the degree of depolarization therefrom.

13. A method as claimed in claim 11 wherein the monitoring means determines a normalized Stokes parameter S1 as hereinbefore defined, determines a statistical distribution of S1 from repeated measurements of S1 over time, and correlates the measured distribution of S1 with distribution templates for a range of values of depolarization.

14. A method as claimed in claim 13 wherein the monitoring means applied polarization rotation to the sample of the modulated optical signal by operation of a polarization rotator.

15. An optical transmission system comprising:
   a transmitter operable to generate an optical signal;
   a modulator operable to modulate the optical signal to obtain a modulated optical signal encoded with a signal data stream;
   a plurality of optical elements constituted by a plurality of optical terminals and at least one optical waveguide means interconnecting the optical terminals and operable to conduct modulated optical signals modulated by the signal data stream therebetween; and
   at least one of the optical elements comprising a birefringent element susceptible to degrading the modulated optical signal by polarization mode dispersion;
   wherein at least one of the optical elements is coupled to monitoring means operable to monitor degradation of the modulated optical signal consistent with the effects of polarization mode dispersion in the presence of modulation by the signal data stream and to output monitored data representative of such degradation.

16. An optical transmission system as claimed in claim 15 comprising comparator means operable to compare the monitored data with a threshold value and means for generating an alarm indication in response to the monitored data exceeding the threshold value.

17. An optical transmission system as claimed in claim 16 comprising a control means responsive to the monitored data and operable to control the operation of the optical transmission system so as to reduce the effects of polarization mode dispersion on the modulated optical signal.

18. An optical transmission system as claimed in claim 17 wherein the control means is operable to control operation of the transmitter.

19. An optical transmission system as claimed in claim 18 wherein the control means is operable to control the operation of the transmitter so as to variably control the state of polarization of the modulated optical signal launched into the waveguide means.

20. An optical transmission system as claimed in claim 18 wherein the control means is operable to control the operation of the transmitter to regulate the signal data stream.

21. An optical transmission system as claimed in claim 17 wherein the control means is operable to control at least one optical switching device of the optical transmission system so as to reroute the path taken by the modulated optical signal.

22. An optical transmission system as claimed in claim 17 wherein the control means is operable to control a compensating optical element constituting an optical element of the system so as to provide compensating dispersion in opposition to the polarization mode dispersion indicated as being present by the monitored data.

23. An optical transmission system as claimed in claim 15 comprising an optical tap coupled to one of the optical elements so as to obtain a sample of the modulated optical signal and wherein the monitoring means is operable to measure the degree of depolarization present in the sample of the modulated optical signal.

24. An optical transmission system as claimed in claim 23 comprising means for compensating the monitored data for other known sources of depolarization.

25. An optical transmission system as claimed in claim 23 wherein the monitoring means comprises a polarization analysis and sampling unit operable to analyze the state of polarization of the sample of the modulated optical signal to provide sampled data filtered to a band width which is less than that of the modulation of the modulated optical signal by the signal data stream.

26. An optical transmission system as claimed in claim 25 wherein the monitoring means comprises a processor operable to determine from the sampled data the filtered polarization state in terms of the Stokes parameters and computes the degree of polarization therefrom.

27. An optical transmission system as claimed in claim 25 wherein the monitoring means is operable to determine a normalized Stokes parameter S1 as hereinbefore defined, to determine a statistical distribution of S1 from repeated measurements of S1 over time and to correlate the measured distribution of S1 with distribution templates for a range of values of depolarization.

28. An optical transmission system as claimed in claim 27 comprising a polarization rotator operable on the sample of the modulated optical signal to apply a polarization rotation.

29. A method of transmitting optical signals in an optical transmission system, comprising the steps of:

generating an optical signal modulated by a signal data stream by operation of a transmitter of the optical transmission system;

conducting the optical signal via a plurality of optical elements constituted by at least one optical waveguide means and at least one optical terminal of the optical transmission system, at least one of the optical elements being susceptible to polarization mode dispersion;

receiving the optical signal at a receiver constituting an optical terminal of the optical transmission system and outputting the signal data stream therefrom;

monitoring the optical signal by operation of a monitoring means so as to detect degradation of the optical signal consistent with the optical signal having been subject to the effects of polarization mode dispersion during transmission;

outputting from the monitoring means monitored data representative of the extent to which the optical signal is degraded by polarization mode dispersion;

comparing the monitored data with a threshold value; and generating an alarm indication in response to the monitored data exceeding the threshold value.

30. A method as claimed in claim 29 wherein the control means controls at least one optical switching device of the optical transmission system so as to reroute the path taken by the optical signal.

31. A method as claimed in claim 29 wherein the control means controls a compensating optical element constituting an optical element of the system so as to provide compensating dispersion in opposition to the polarization mode dispersion indicated as being present by the monitored data.

32. A method as claimed in claim 29 wherein the monitoring means derives a sample of the optical signal by operation of an optical tap and measures the degree of depolarization present in the sample of the optical signal; and including the step of compensating for known sources of depolarization other than polarization mode dispersion.

33. A method as claimed in claim 32 wherein the monitoring means performs an analysis of the state of polarization of the sample of the optical signal, filtered to a band width which is less than that of the modulation of the optical signal by the signal data stream.

34. A method as claimed in claim 33 wherein the monitoring means fully determines the filtered polarization state in terms of the Stokes parameters and computes the degree of depolarization therefrom.

35. A method as claimed in claim 32 wherein the monitoring means determines a normalized Stokes parameter S1 as hereinbefore defined, determines a statistical distribution of S1 from repeated measurements of S1 over time, and correlates the measured distribution of S1 with distribution templates for a range of values of depolarization.

36. A method as claimed in claim 35 wherein the monitoring means applies polarization rotation to the sample of the optical signal by operation of polarization rotator.

37. An optical transmission system comprising:

a plurality of optical elements constituted by a plurality of optical terminals and at least one optical waveguide means interconnecting the optical terminals and operable to conduct optical signals modulated by a signal data stream therebetween; and at least one of the optical elements comprising a birefringent element susceptible to degrading the optical signals by polarization mode dispersion, wherein at least one of the optical elements is coupled to monitoring means operable to monitor degradation of the optical signals consistent with the effects of polarization mode dispersion and to output monitored data representative of such degradation.

38. The optical transmission system as claimed in claim 37 further comprising a comparator operable to compare the monitored data with a threshold value and means for generating an alarm indication in response to the monitored data exceeding the threshold value.

39. An optical transmission system as claimed in claim 38 further comprising a control means responsive to the monitored data and operable to control the operation of the optical transmission system so as to reduce the effects of polarization mode dispersion on the transmitted optical signal.

40. An optical transmission system as claimed in claim 39 wherein the control means is operable to control operation of the transmitter.

41. An optical transmission system as claimed in claim 40 wherein the control means is operable to control the operation of the transmitter so as to variably control the sate of polarization of the optical signal launched into the optical waveguide means.

42. An optical transmission system as claimed in claim 40 wherein the control means is operable to control the operation of the transmitter to regulate the signal data stream.

43. An optical transmission system as claimed in claim 39 wherein the control means is operable to control at least one optical switching device of the optical transmission system so as to reroute the path taken by the optical signal.

44. An optical transmission system as claimed in claim 39 wherein the control means is operable to control a compensating optical element constituting an optical element of the system so as to provide compensating dispersion in opposition to the polarization mode dispersion indicated as being present by the monitored data.

45. An optical transmission system as claimed in claim 37 comprising an optical tap coupled to one of the optical elements so as to obtain a sample of the optical signal and wherein the monitoring means is operable to measure the degree of depolarization present in the sample of the optical signal; and said optical transmission system further comprising means for compensating the monitored data for other known sources of depolarization.

46. An optical transmission system as claimed in claim 45 wherein the monitoring means comprises a polarization analysis and sampling unit operable to analyze the state of polarization of the sample of the optical signal to provide sampled data filtered to a band width which is less than that of the modulation of the optical signal by the signal data stream.

47. An optical transmission system as claimed in claim 46 wherein the monitoring means comprises a processor operable to determine from the sampled data the filtered polarization state in terms of the Stokes parameters and computes the degree of polarization therefrom.

48. An optical transmission system as claimed in claim 46 wherein the monitoring means is operable to determine a normalized Stokes parameter S1 as hereinbefore defined, to determine a statistical distribution of S1 from repeated measurements of S1 over time and to correlate the measured distribution of S1 with distribution templates for a range of values of depolarization.

49. An optical transmission system as claimed in claim 48 comprising a polarization rotator operable on the sample of the optical signal to apply a polarization rotation.

50. Monitoring apparatus for use in an optical transmission system, the monitoring apparatus comprising:

sampling means operable to sample a state of polarization of a received optical signal modulated by a signal data stream to provide sampled data;

a processor operable to determine monitored data from the sampled data representative of the effect of polarization mode dispersion in the transmission system; and an optical tap coupled to an optical element of the optical transmission system and operable to extract a sample of the optical signal therefrom;

wherein the processor is operable to determine the monitored data as a measure of the extent to which the sample of the optical signal is depolarized.

51. Monitoring apparatus as claimed in claim 50 comprising a polarization analysis and sampling unit operable to provide sample data representative of the state of polarization of the sample of the optical signal, filtered to a band width which is less than that of the modulation of the optical signal by a signal data stream carried on the optical transmission system.

52. Monitoring apparatus as claimed in claim 51 comprising a polarization rotator operable to randomize the polarization state of the sample of the optical signal.

53. A method of transmitting optical signals in an optical transmission system comprising the steps of:

generating an optical signal modulated by a signal data stream by operation of a transmitter of the optical transmission system;

conducting the optical signal via a plurality of optical elements constituted by at least one optical waveguide means and at least one optical terminal of the optical transmission system, at least one of the optical elements being susceptible to polarization mode dispersion;

receiving the optical signal at a receiver constituting an optical terminal of the optical transmission system and outputting the signal data stream therefrom;

monitoring the optical signal by operation of a monitoring means so as to detect degradation of the optical signal consistent with the optical signal having been subject to the effects of polarization mode dispersion during transmission;

outputting from the monitoring means monitored data representative of the extent to which the optical signal is degraded by polarization mode dispersion; and controlling the operation of the optical transmission system by operation of a control means responsive to the monitored data so as to reduce the effects of polarization mode dispersion on the transmitted optical signal.

* * * * *